(12) United States Patent  
Ridgway et al.

(10) Patent No.: US 7,625,009 B2  
(45) Date of Patent: Dec. 1, 2009

(54) COLLAPSIBLE STEERING COLUMN SUPPORT

(75) Inventors: Jason R. Ridgway, Bay City, MI (US); Sam L. Scrivener, Durand, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 321 days.

(21) Appl. No.: 11/702,885

(22) Filed: Feb. 6, 2007

(65) Prior Publication Data

US 2008/0185830 A1    Aug. 7, 2008

(51) Int. Cl.
*B62D 1/19*     (2006.01)
(52) U.S. Cl. .......................... 280/777; 280/775; 74/493
(58) Field of Classification Search ................. 280/775, 280/777; 74/492, 493
See application file for complete search history.

(56) References Cited

U.S. PATENT DOCUMENTS

| | | | |
|---|---|---|---|
| 4,602,520 A * | 7/1986 | Nishikawa et al. | 74/493 |
| 5,081,879 A * | 1/1992 | Pidgeon | 74/492 |
| 6,176,151 B1 * | 1/2001 | Cymbal | 74/492 |
| 6,659,504 B2 | 12/2003 | Riefe et al. | |
| 6,688,644 B2 * | 2/2004 | Tsunoda et al. | 280/777 |
| 2001/0019205 A1 * | 9/2001 | Ikeda et al. | 280/775 |
| 2002/0140219 A1 * | 10/2002 | Tsunoda et al. | 280/779 |
| 2004/0007863 A1 * | 1/2004 | Yamasaki | 280/775 |
| 2006/0000307 A1 * | 1/2006 | Tanaka et al. | 74/492 |
| 2006/0151984 A1 * | 7/2006 | Higashino et al. | 280/775 |

* cited by examiner

*Primary Examiner*—Paul N Dickson
*Assistant Examiner*—Drew Brown
(74) *Attorney, Agent, or Firm*—Cantor Colburn LLP

(57) ABSTRACT

A support mechanism for a collapsible steering column assembly having a rake adjustment is provided. The steering column assembly includes a mounting bracket and a column jacket pivotably attached to the mounting bracket for rotation about a rake axis. The support mechanism includes a rod pivotably coupled to the column jacket and a clamp pivotably coupled to the mounting bracket and interconnecting the rod and the mounting bracket. The clamp permits movement of the rod therethrough during collapse of the steering column assembly in only one direction, and is offset from the rake axis. Accordingly, the clamp prevents backward movement of the rod therethrough, thereby preventing rotation of the column jacket about the rake axis post collapse of the steering column assembly to support the column jacket in an elevated position.

19 Claims, 5 Drawing Sheets

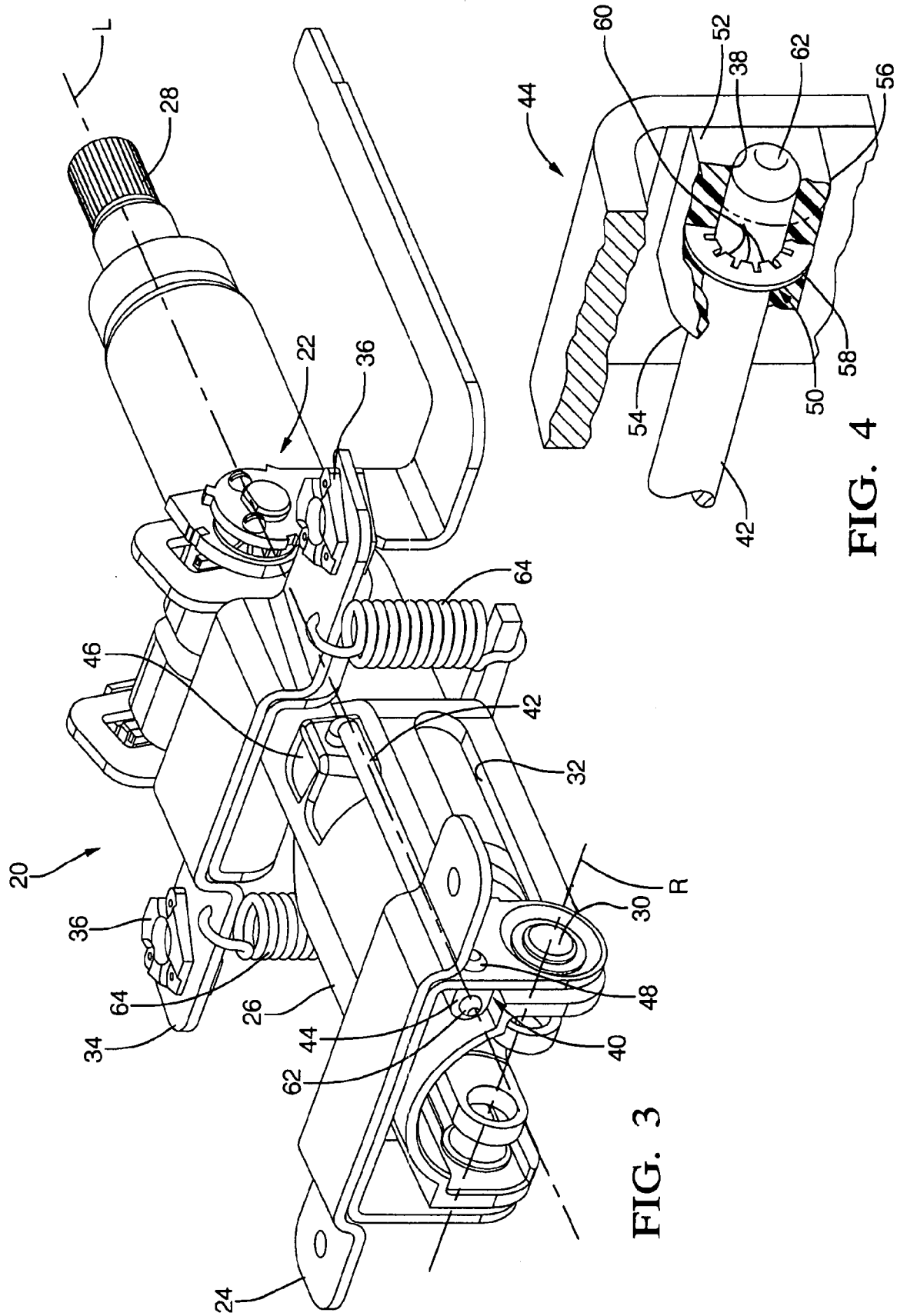

COLLAPSIBLE STEERING COLUMN SUPPORT

BACKGROUND OF THE INVENTION

1. Field of the Invention

The subject invention generally relates to a collapsible steering column assembly having a rake adjustment for a vehicle, and more specifically to supporting the steering column assembly post-collapse of the steering column assembly.

2. Description of the Prior Art

Collapsible steering column assemblies that include a rake adjustment for adjusting the height of the steering column are well known in the art. The collapsible steering column assembly includes a mounting bracket that attaches a column jacket to a vehicle. The column jacket is pivotable about a rake axis, and is supported in an elevated position by a rake bracket prior to collapse of the steering column assembly to prevent the column jacket from rotating downward onto a driver of the vehicle. The steering column assembly further includes a support mechanism that supports the column jacket in the elevated position after it has been collapsed as a result of an emergency event to prevent the column jacket from pivoting about the rake axis and falling onto a driver of the vehicle after collapse of the steering column assembly. Typically, the support mechanism is integrated into the mounting bracket, as is shown in Prior Art FIGS. 1 and 2.

Referring to Prior Art FIG. 1, the steering column assembly includes the rake bracket connected to the mounting bracket by a plurality of rivets. The mounting bracket includes a plurality of slots, with each of the rivets disposed in one of the slots. Upon collapse of the steering column assembly, the rivets move with the rake bracket within the slots while still supporting the rake bracket and the column jacket in the elevated position. Accordingly, the rake bracket and the column jacket are supported in the elevated position both pre-collapse and post-collapse of the steering column assembly.

Referring to Prior Art FIG. 2, the mounting bracket includes a lip for supporting edges of the rake bracket. Upon collapse of the steering column assembly, the edges of the rake bracket slide along the lip of the mounting bracket. Accordingly, the rake bracket and the column jacket are supported in the elevated position both pre-collapse and post-collapse of the steering column assembly.

While the prior art steering column assemblies function adequately for supporting the column jacket in the elevated position post collapse of the steering column assembly, there remains a need to provide a cheaper, more easily produced support mechanism for supporting the column jacket after collapse of the steering column assembly.

SUMMARY OF THE INVENTION AND ADVANTAGES

The subject invention provides a steering column assembly for a vehicle. The steering column assembly comprises a mounting bracket for attaching the steering column assembly to the vehicle. A column jacket is connected to the mounting bracket, and is longitudinally moveable relative to the mounting bracket along a longitudinal axis in response to an emergency event. The column jacket is also pivotally moveable relative to the mounting bracket about a rake axis. A rake bracket is coupled to the column jacket, and spaced from the mounting bracket along the longitudinal axis. The rake bracket attaches the column jacket to the vehicle in an elevated position prior to the emergency event, and is detachable from the vehicle in response to the longitudinal movement of the column jacket in response to the emergency event. A support mechanism is interconnected between the mounting bracket and the column jacket. The support mechanism pivots with the column jacket during the pivotal movement, and supports the column jacket in the elevated position after detachment of the rake bracket from the vehicle in response to the emergency event.

Accordingly, the subject invention provides a support mechanism for supporting the column jacket in the elevated position after collapse of the steering column assembly. The support mechanism pivots with the column jacket as an operator of the vehicle adjusts the height of the steering column assembly, which permits the size of the mounting bracket to be reduced, thereby minimizing the cost of producing the steering column assembly.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a perspective view of a steering column assembly in a pre-collapse state;

FIG. 4 is an enlarged perspective view of a clamp of a support mechanism in the pre-collapse state of the steering column assembly

DETAILED DESCRIPTION OF THE INVENTION

Figure 1:
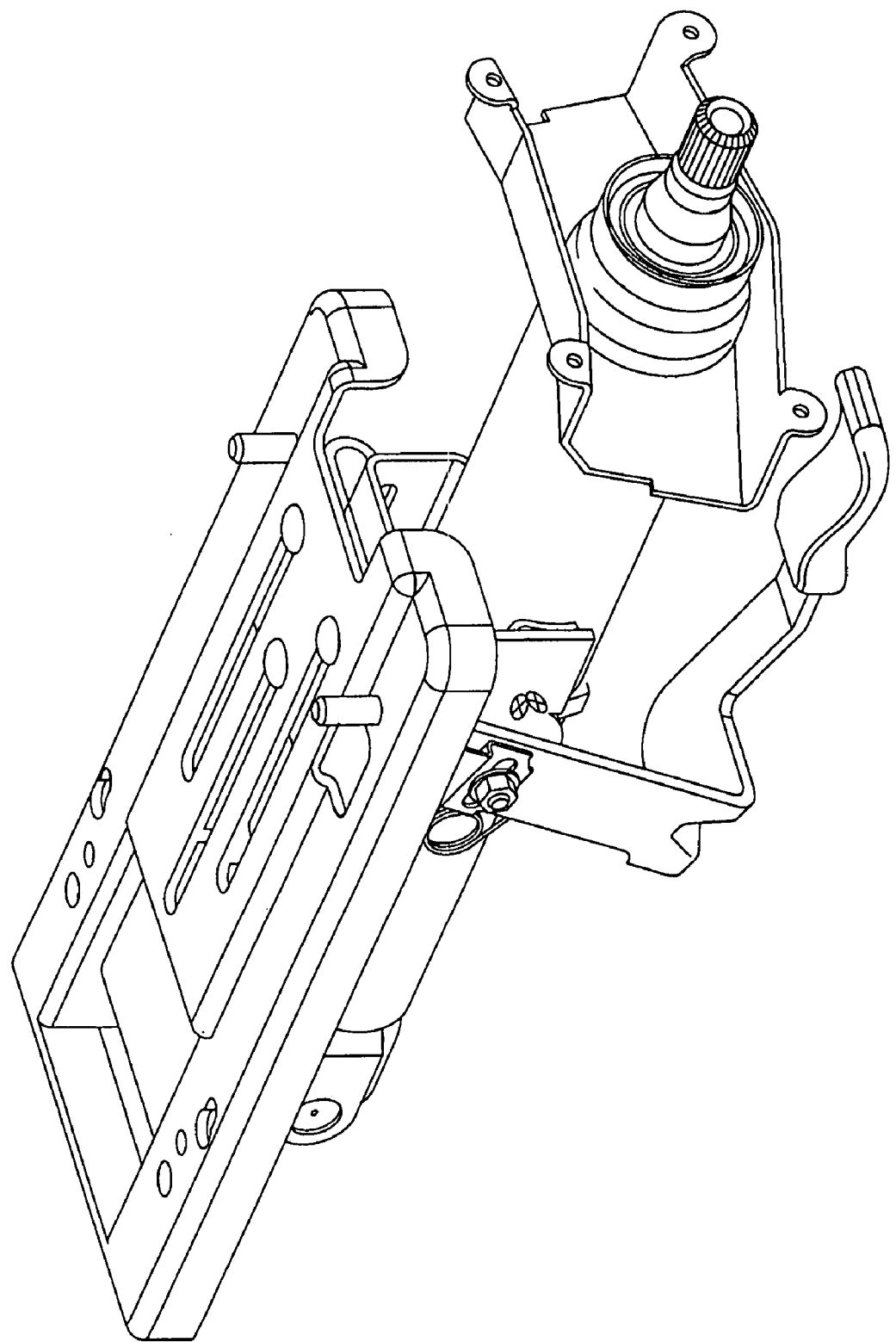
FIG. 1 is a perspective view of a prior steering column assembly.
Figure 2:
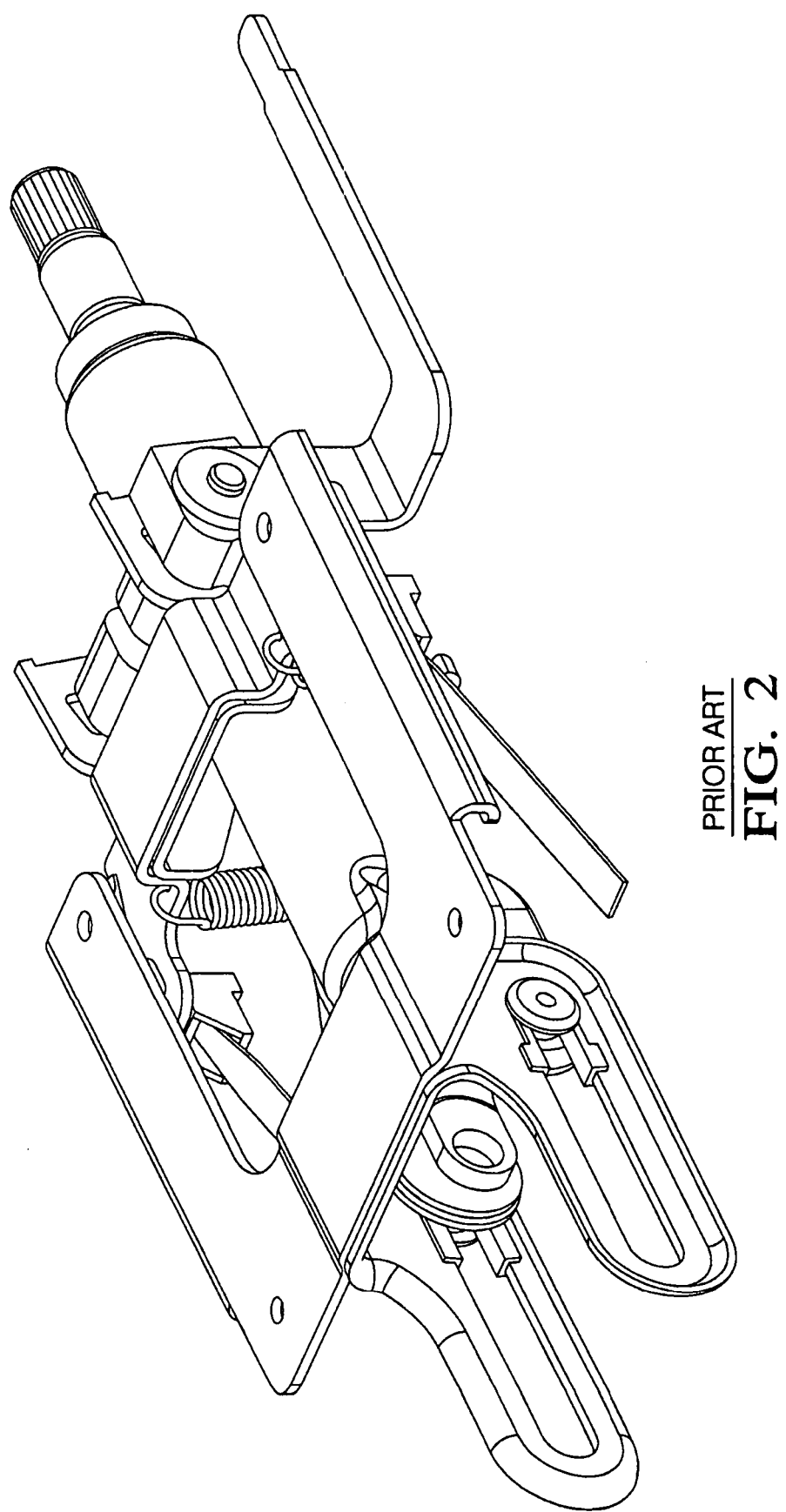
FIG. 2 is a perspective view of another prior steering column assembly.

Referring to the Figures, wherein like numerals indicate corresponding parts throughout the several views, a steering column assembly is generally shown at 20. The steering column assembly 20 is for a vehicle, and is collapsible in response to an emergency event as is well known in the art. Additionally, the steering column assembly 20 includes a rake adjustment mechanism shown generally at 22 for adjusting the height of the steering column within the vehicle as is also well known in the art.

Referring to FIG. 3, the steering column assembly 20 includes a mounting bracket 24 for attachment to the vehicle. Preferably, the mounting bracket 24 is attached to a support structure by a fastener, such as a bolt, within the vehicle. However, the mounting bracket 24 may be attached to the vehicle in any number of ways known to those skilled in the art.

A column jacket 26 is connected to the mounting bracket 24, and is longitudinally moveable relative to the mounting bracket 24 along a longitudinal axis L. The column jacket 26 supports a steering column shaft 28 therein as is well known in the art. The column jacket 26 moves along the longitudinal axis L in response to an emergency event. The column jacket 26 is also pivotally moveable relative to the mounting bracket 24 about a rake axis R. As is known in the art, the column jacket 26 pivots about the rake axis R to adjust the height of the column jacket 26, and thereby the position of a steering wheel within the vehicle.

A pin 30 interconnects the mounting bracket 24 and the column jacket 26, with the column jacket 26 defining a slot 32 extending parallel the longitudinal axis L. The slot 32 receives the pin 30 therethrough to permit slideable movement between the mounting bracket 24 and the column jacket 26, thereby permitting the steering column to collapse in response to the emergency event.

Preferably, the pin 30 defines the rake axis R, with a central axis of the pin 30 being concentric with the rake axis R. However, it is contemplated that the steering column assembly 20 may be configured otherwise than as described herein and that the rake axis R may be defined by some other feature of the steering column assembly 20.

A rake bracket 34 is coupled to the column jacket 26 and spaced from the mounting bracket 24 along the longitudinal axis L. The rake bracket 34 attaches the column jacket 26 to the vehicle in an elevated position prior to the emergency event, and is detachable from the vehicle in response to the longitudinal movement of the column jacket 26 in response to the emergency event. A release capsule 36 is disposed on the rake bracket 34, and releasably interconnects the rake bracket 34 to the vehicle. The release capsule 36 is releasably attached to the rake bracket 34, and typically includes an aperture for passing a fastener therethrough to connect the rake bracket 34 to the vehicle. Upon collapse of the steering column assembly 20, the release capsule 36 and the fastener disposed therethrough detach from the rake bracket 34, no longer attaching the rake bracket 34 to the vehicle. Accordingly, the rake bracket 34 supports the column jacket 26 in the elevated position pre-collapse of the steering column assembly 20, but does not support the column jacket 26 in the elevated position post-collapse of the steering column assembly 20.

As referred to herein, the elevated position of the column jacket 26 refers to the normal operating position of the steering column assembly 20. Failure to support the column jacket 26 in the elevated position post-collapse of the steering column assembly 20 would result in the column jacket 26, and the steering wheel, rotating about the rake axis R onto an operator of the vehicle.

Therefore, the steering column assembly 20 includes a support mechanism generally shown at 40, interconnected between the mounting bracket 24 and the column jacket 26. The support mechanism 40 pivots with the column jacket 26 during the pivotal movement of the column jacket 26, and supports the column jacket 26 in the elevated position after detachment of the rake bracket 34 from the vehicle in response to the emergency event. The support mechanism 40 includes a rod 42 coupled to one of the column jacket 26 and the mounting bracket 24, and a clamp 44 coupled to the other of the column jacket 26 and the mounting bracket 24. The rod 42 and the clamp 44 interconnect the column jacket 26 and the mounting bracket 24, and are longitudinally moveable relative to each other. A first pivotal connection 46 interconnects the support mechanism 40 and the column jacket 26, and a second pivotal connection 48 interconnects the support mechanism 40 and the mounting bracket 24.

Preferably, the rod 42 is coupled to the column jacket 26 for longitudinal movement with the column jacket 26. Accordingly, the first pivotal connection 46 interconnects the column jacket 26 and the rod 42, with the rod 42 defining a pivot point about which the rod 42 pivots relative to the column jacket 26. The rod 42 moves along a path in a non-intersecting relationship relative to the rake axis R in response to the emergency event. The clamp 44 is preferably stationary relative to the mounting bracket 24 and is in spaced relationship relative to the rake axis R. The rod 42 is in slideable engagement with the clamp 44 for one-way movement of the rod 42 relative to the clamp 44 as the rod 42 moves longitudinally along the longitudinal axis L during the emergency event. Preferably, the clamp 44 is coupled to the mounting bracket 24. Accordingly, the second pivotal connection 48 interconnects the clamp 44 and the mounting bracket 24. However, it should be understood that the clamp 44 may be coupled to some other feature of the vehicle or steering column assembly 20, so long as it is stationary during the collapse of the steering column assembly 20, i.e., in response the emergency event, the column jacket 26 moves relative to the clamp 44. Alternatively, the clamp 44 may be coupled to the column jacket, in which case the first pivotal connection 46 interconnects the clamp 44 and the column jacket 26; likewise, the rod 42 may be coupled to the mounting bracket, in which case the second pivotal connection 48 interconnects the rod 42 and the mounting bracket 24. It should be understood that when the rod 42 is coupled to the mounting bracket 24 and the clamp 44 is coupled to the column jacket the rod 42 is stationary relative to the mounting bracket 24, and the clamp 44 moves longitudinally with the column jacket 26 relative to the rod 42.

Figure 5:
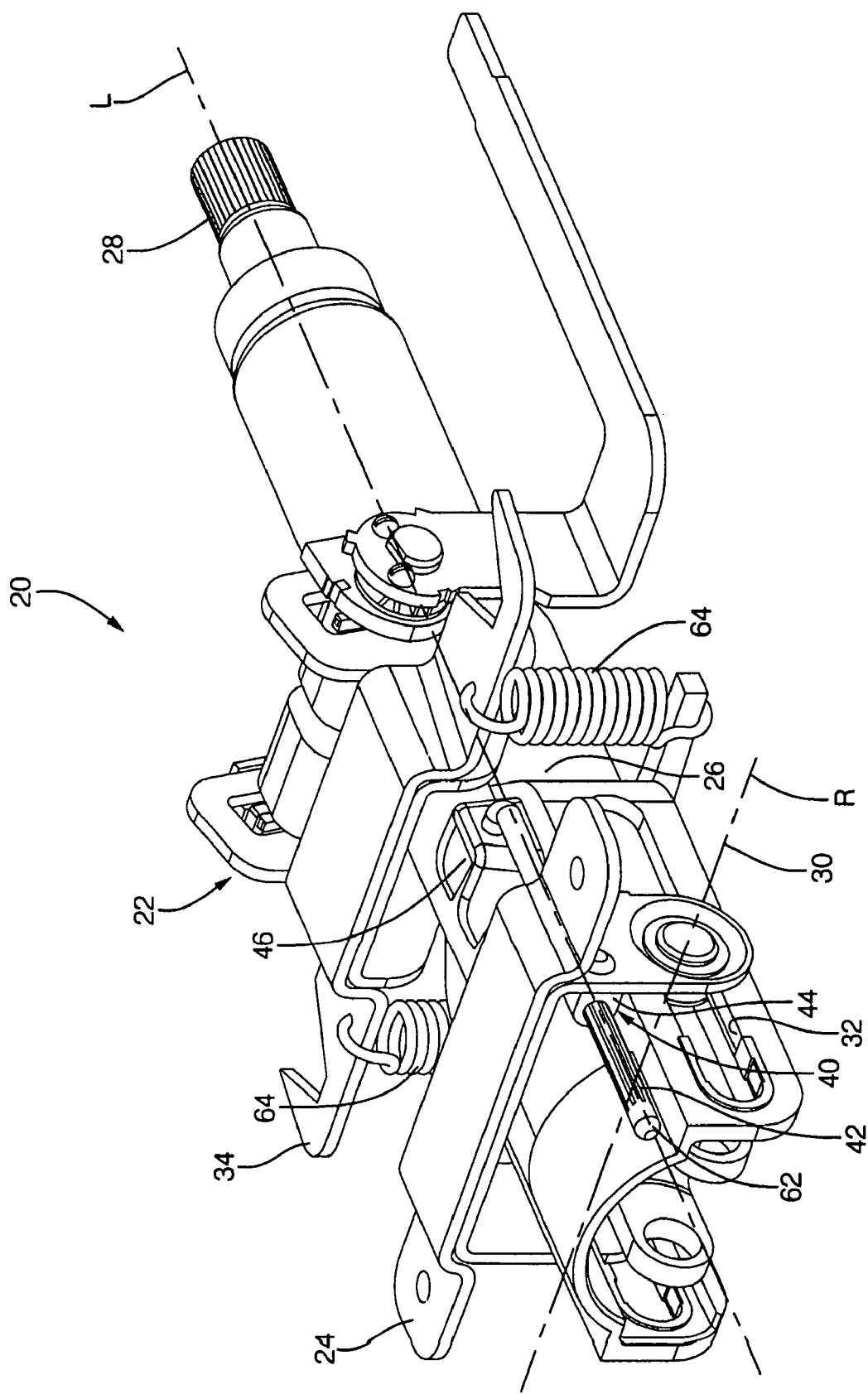
FIG. 5 is a perspective view of the steering column assembly in a post-collapse state.
Figure 6:
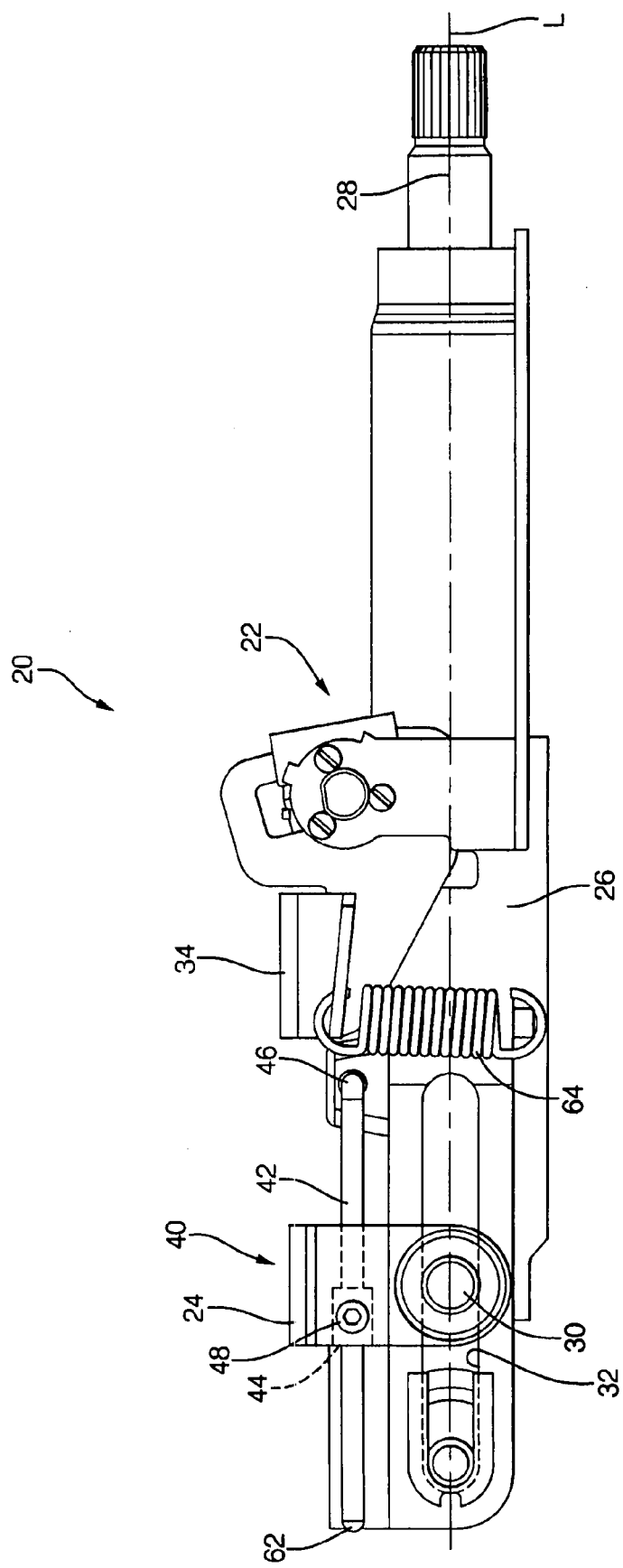
FIG. 6 is a side view of the steering column assembly in the post-collapse state.

Referring to FIG. 4, the clamp 44 includes a retention device 50 for allowing longitudinal movement of the rod 42 in a single direction in response to the emergency event to hold the rod 42 in place after the emergency event. Preferably, the clamp 44 includes a housing 52 defining a bore 38 having a first section 54 and a second section 56. The retention device 50 includes a non-slip washer 58 disposed between the first section 54 and the second section 56 of the bore 38 for permitting longitudinal movement of the rod 42 in a single direction only. The non-slip washer 58 includes a plurality of teeth 60 for engaging the rod 42. The rod 42 includes a distal end 62, which is disposed within the first section 54 of the bore 38 prior to detachment of the rake bracket 34 from the vehicle. Referring to FIGS. 5 and 6, the distal end 62 of the rod 42 advances through the clamp 44, engaging the retention device 50 upon the collapse of the steering column assembly 20. Accordingly, the steering column assembly 20 is free to rotate about the rake axis R prior to detachment of the rake bracket 34 from the vehicle, and is prevented from rotation about the rake axis R after detachment of the rake bracket 34 from the vehicle, i.e., after collapse of the steering column assembly 20, the rod 42 advances through the clamp 44, with the clamp 44 restraining the rod 42 from backward movement, thereby supporting the column jacket 26 in substantially the same elevated position as the column jacket was in prior to detachment of the rake bracket. It should be understood that the clamp 44 and the retention device 50 may be otherwise configured than as described herein to permit one-way movement of the rod 42 relative to the clamp 44 and still fall within the scope of the claims.

As best shown in FIG. 6 and as noted above, the support mechanism 40 moves longitudinally along the longitudinal axis L in a non-intersecting relationship with the rake axis R, with the rake axis R and the second pivotal connection 48 stationary relative to the first pivotal connection 46. Accordingly, when viewed from the side, the first pivotal connection 46, the second pivotal connection 48, and the rake axis R form the vertices of a triangle. As such, because the rake axis R and the second pivotal connection 48 remain stationary, the only way for the column jacket 26 to rotate about the rake axis R after the rod 42 has advanced through the clamp 44, as a result of the emergency event, would be for the rod 42 to withdraw backwards through the clamp 44. Since the clamp 44 limits the movement of the rod 42 to a single direction, the rod 42 is unable to withdraw through the clamp 44 in the opposite direction. Accordingly, the column jacket is unable to rotate about the rake axis R, and thereby supported in substantially the same elevated position post-collapse, as the column jacket was in prior to detachment of the rake bracket.

Referring back to FIG. 3, the steering column further comprises a biasing device 64, which interconnects the column jacket 26 and the rake bracket 34. The biasing device 64 continuously biases the column jacket 26 toward the rake bracket 34. The biasing device 64 is preferably a coil spring, but may include some other device capable of urging the column jacket 26 against the rake bracket 34. After the rake bracket 34 is detached upon the emergency event, the biasing device 64 continues to urge the column jacket against the rake bracket 34. The biasing device 64 assists the rake adjustment mechanism 22, and provides and upward lift prior to detachment of the rake bracket 34 from the vehicle to prevent the column jacket from dropping onto the operator of the vehicle while the operator is using the rake adjustment mechanism 22.

The rake adjustment mechanism 22 operates prior to the emergency event and pre-collapse of the steering column assembly 20 to release the column jacket temporarily to adjust the height of the steering wheel. After which, the rake adjustment mechanism 22 secures the column jacket in the desired position. There are many configurations of rake adjustment mechanisms 22 known in the art, which may be installed and utilized on the above described steering column assembly 20. Accordingly, the rake adjustment mechanism 22 is not specifically described herein.

The steering column assembly 20 may further include an energy absorbing device (not shown) for absorbing energy from the column jacket 26 in response to the longitudinal movement of the column jacket 26 during the emergency event. The energy absorbing device dissipates energy transmitted through the steering column assembly 20 as a result of the emergency event, typically by deforming a metal strip. There are many configurations of energy absorbing devices 50, 64 known in the art which may be installed and utilized on the above described steering column assembly 20, Accordingly, the exact configuration of the energy absorbing device is not specifically described herein.

The foregoing invention has been described in accordance with the relevant legal standards; thus, the description is exemplary rather than limiting in nature. Variations and modifications to the disclosed embodiments may become apparent to those skilled in the art and do come within the scope of the invention. Accordingly, the scope of legal protection afforded this invention can only be determined by studying the following claims.

What is claimed is:

1. A steering column assembly for a vehicle, said assembly comprising:
    a mounting bracket for attachment to the vehicle;
    a column jacket connected to said mounting bracket and longitudinally moveable relative to said mounting bracket along a longitudinal axis in response to an emergency event and pivotally moveable relative to said mounting bracket about a rake axis;
    a rake bracket coupled to said column jacket and spaced from said mounting bracket along said longitudinal axis for attaching said column jacket to the vehicle in an elevated position prior to the emergency event and detachable from the vehicle in response to said longitudinal movement of said column jacket in response to the emergency event;
    a support mechanism interconnected between said mounting bracket and said column jacket with said support mechanism pivoting with said column jacket during said pivotal movement and supporting said column jacket in substantially the same elevated position after detachment of said rake bracket from the vehicle in response to the emergency event, as the column jacket was in prior to detachment of said rake bracket.

2. An assembly as set forth in claim 1 wherein said support mechanism includes a rod coupled to one of said column jacket and said mounting bracket and a clamp coupled to the other of said column jacket and said mounting bracket for interconnecting said column jacket and said mounting bracket with said rod and said clamp longitudinally moveable relative to each other.

3. An assembly as set forth in claim 2 wherein said rod is coupled to said column jacket for longitudinal movement with said column jacket in a non-intersecting relationship relative to said rake axis in response to the emergency event.

4. An assembly as set forth in claim 3 further comprising a first pivotal connection interconnecting said rod and said column jacket.

5. An assembly as set forth in claim 4 wherein said clamp is coupled to said mounting bracket in spaced relationship relative to said rake axis.

6. An assembly as set forth in claim 5 further comprising a second pivotal connection interconnecting said clamp and said mounting bracket.

7. An assembly as set forth in claim 6 wherein said clamp includes a retention device for allowing longitudinal movement of said rod in a single direction in response to the emergency event to hold the rod in place after the emergency event.

8. An assembly as set forth in claim 2 wherein said clamp is coupled to said column jacket for longitudinal movement with said column jacket in a non-intersecting relationship relative to said rake axis in response to the emergency event.

9. An assembly as set forth in claim 8 wherein said rod is stationary relative to said mounting bracket and in spaced relationship relative to said rake axis and in slideable engagement with said clamp for one way movement of said rod relative to said clamp as said clamp moves longitudinally along said longitudinal axis during the emergency event.

10. An assembly as set forth in claim 2 wherein said clamp includes a retention device for allowing longitudinal movement of said rod in a single direction in response to the emergency event to hold the rod in place after the emergency event.

11. An assembly as set forth in claim 10 wherein said clamp includes a housing defining a bore having a first section and a second section and wherein said retention device includes a non-slip washer disposed between said first section and said second section for permitting longitudinal movement of said rod in a single direction only.

12. An assembly as set forth in claim 11 wherein said rod includes a distal end disposed within said first section of said bore adjacent said retention device prior to the emergency event for engagement with said retention device after detachment of said rake bracket from the vehicle.

13. An assembly as set forth in claim 11 wherein said non-slip washer includes a plurality of teeth for engaging said rod.

14. An assembly as set forth in claim 1 further comprising a first pivotal connection interconnecting said support mechanism and said column jacket.

15. An assembly as set forth in claim 14 further comprising a second pivotal connection interconnecting said support mechanism and said mounting bracket.

16. An assembly as set forth in claim 1 further comprising a pin defining said rake axis and interconnecting said mounting bracket and said column jacket and wherein said column jacket includes a slot extending parallel to said longitudinal axis for receiving said pin therethrough to permit slideable movement between said mounting bracket and said column jacket.

17. An assembly as set forth in claim 1 further comprising a biasing device interconnecting said column jacket and said rake bracket for continuously biasing said column jacket toward said rake bracket.

18. An assembly as set forth in claim 1 further comprising a rake adjustment mechanism.

19. An assembly as set forth in claim 1 further comprising a release capsule coupled to said rake bracket for releasably interconnecting said rake bracket to the vehicle.

* * * * *